US005432508A

United States Patent [19]

Jackson

[11] Patent Number: 5,432,508
[45] Date of Patent: Jul. 11, 1995

[54] TECHNIQUE FOR FACILITATING AND MONITORING VEHICLE PARKING

[76] Inventor: Wayne B. Jackson, 291 S. Lafayette St., Denver, Colo. 80209

[21] Appl. No.: 946,879

[22] Filed: Sep. 17, 1992

[51] Int. Cl.[6] .......................... B60Q 1/48; G08G 1/14
[52] U.S. Cl. ................................ 340/932.2; 340/942; 377/9
[58] Field of Search .................. 340/932.2, 942; 377/9

[56] References Cited

U.S. PATENT DOCUMENTS

| | | | |
|---|---|---|---|
| 3,097,295 | 7/1963 | Williams | 340/932.2 |
| 3,114,128 | 12/1963 | Ljungman et al. | 340/932.2 |
| 3,130,298 | 4/1964 | Schwarz | 235/92 |
| 3,158,836 | 11/1964 | McCauley | 340/932.2 |
| 3,161,275 | 12/1964 | Sullivan | 340/932.2 |
| 3,166,732 | 1/1965 | Ljungman et al. | 340/932.2 |
| 3,270,847 | 9/1966 | Rudberg | 340/932.2 |
| 3,376,547 | 4/1968 | Auer | 340/932.2 |
| 3,400,365 | 9/1968 | French | 340/933 |
| 3,867,615 | 2/1975 | Sioufi | 235/92 |
| 4,043,117 | 8/1977 | Maresca | 368/6 |
| 4,101,868 | 7/1978 | Bubnich et al. | 340/932.2 |
| 4,145,681 | 3/1979 | Bubnich et al. | 340/932.2 |
| 4,191,939 | 3/1980 | Bauman | 340/468 |
| 4,224,624 | 9/1980 | Evans | 342/450 |
| 4,310,890 | 1/1982 | Trehn et al. | 364/467 |
| 4,654,834 | 3/1987 | Dorr | 367/96 |
| 4,670,844 | 6/1987 | Lach et al. | 364/436 |
| 4,692,755 | 9/1987 | Hahn | 340/687 |
| 4,808,997 | 2/1989 | Barkley et al. | 340/942 |
| 4,825,928 | 5/1989 | Woodrow | 160/1 |
| 4,843,373 | 6/1989 | Trickle et al. | 340/540 |
| 5,293,163 | 3/1994 | Kakihara et al. | 340/995 |

*Primary Examiner*—John K. Peng
*Assistant Examiner*—Daryl C. Pope
*Attorney, Agent, or Firm*—John R. Ley; Holland & Hart; Charles C. Cary

[57] ABSTRACT

Parking for vehicles is facilitated, monitored and controlled by using sensors to determine the availability of vacant parking spaces and by indications to alert vehicle operators at a substantial distance of the availability a vacant space. A computer controlled system monitors the sensors and controls the delivery indicator signals. Data regarding parking occupancy is used to inform drivers entering the facility and prospective users, via a telephone interface, of the availability of parking. The telephone interface further allows users to reserve parking spaces and charge the cost of the reserved space.

45 Claims, 9 Drawing Sheets

TECHNIQUE FOR FACILITATING AND MONITORING VEHICLE PARKING

This invention relates generally to parking vehicles in garages and other parking facilities. More particularly, the present invention relates a new and improved technique for facilitating the parking of vehicles by monitoring the availability and use of parking within a parking facility, informing vehicle operators of available parking spaces and collecting data for use by the management of the parking facility regarding the availability and/or occupancy of spaces in the parking facility. Further still, the new and improved technique allows the information concerning the availability of parking in the parking facility to be remotely accessed by telephone, for example, and allows reservations of and payment for parking spaces to be achieved remotely, by prospective patrons of the facility.

BACKGROUND OF THE INVENTION

Automobile parking poses a concern in many areas, particularly in densely populated areas. In business centers, at airports and around shopping malls, parking spaces can be insufficient or difficult to find. The shortage of parking spaces, however, is only one problem for drivers; traditional parking schemes relegate drivers to trial-and-error hunting for parking which takes time and may generate frustration. Nonetheless, searching for parking may be preferable to the alternative: entrusting one's car to strangers at a valet parking facility.

In common "self-service" parking facilities, parking availability information provided to prospective patrons typically consists of a sign indicating whether the facility is full. If the facility is not full, typically no information is provided to vehicle operators concerning the quantity or location of available parking and the vehicle operators must rely on trial and error to find available parking spaces. Even though a vehicle operator entering a business district parking facility early in the day can assume parking spaces are more likely to be available in less readily accessible areas of the facility, in a business district at midday, or at shopping centers and airports at nearly all times, vehicle operators sporadically vacate parking spaces as dictated by individual agendas; one is just as likely to find a parking space in a readily accessible area of such a facility as in a less accessible area.

Further, even when parking spaces actually are readily available among parked vehicles, vehicle operators must proceed slowly in their search because already-parked vehicles visually obstruct the presence of available spaces. Also, without information about where to find available parking, drivers cannot exercise individual preferences; some vehicle operators might elect to walk from a less convenient space to save the time they might otherwise spend to find a more convenient space if they knew they could proceed directly to an available parking space.

Despite the problems encountered by vehicle operators at parking facilities, most existing parking monitoring systems focus on collecting information for management. Some prior art systems employ sensors at entrances and exits to parking facilities or sections of such facilities (See U.S. Pat. No. 3,130,298 to Schwarz). These sensors trigger a counter to determine the number of cars in the monitored area by subtracting the number of cars leaving the area from those that have entered. At least one of these monitoring systems also engage a timer to determine the aggregate usage time of the facility by summing the total time from the entry of the cars to their departure (See U.S. Pat. No. 3,867,615 to Sioufi). These systems profess to be useful in monitoring the usage of the parking facility.

Prior art curbside parking monitoring systems have been coupled with centralized signals which indicate general areas where drivers may find a curbside parking space (See U.S. Pat. Nos. 3,114,128 and 3,166,732 to Ljungman). Upon sensing that a space adjacent a parking meter is vacant, the system signals drivers from a signpost at an intersection of the city block along which the parking space is vacant. The signal appears in a binary yes or no stating that one or more parking spaces are available in the adjacent block-long area. However, because the driver seeing a parking available signal is not advised of the number and specific location of parking spaces that are available in that block, the vehicle operator may proceed to the indicated location to find that a single available space has already been occupied or that the space will not accommodate his vehicle. In either situation, the binary availability signal may lead the vehicle operator on a fruitless quest.

Another monitoring system for a parking facility compares the number of cars within a designated area (determined by counting cars entering minus cars departing the area) with the number of spaces within that area. When the net number of cars equals the number of spaces, the system registers that the area is completely full and signals drivers to proceed to the next area (See U.S. Pat. No. 3,158,836 to McCauley). Unfortunately, such systems again only yield a binary yes or no signal to the drivers. Even if an area contains only one available space, even if the space is obstructed, will not accommodate the driver's car, or is otherwise undesirable, a driver still will be lead to that area.

These prior art systems are of only limited help to vehicle operators and do not resolve many concerns associated with parking an automobile. It is because of these and other background considerations that the present invention has evolved.

SUMMARY OF THE INVENTION

General objectives of the present invention are to facilitate and monitor vehicular parking more effectively, to make parking more convenient for vehicle operators by providing information to efficiently guide them to available parking spaces, to provide better information to parking facility management concerning the usage and occupancy of the parking facility, and to allow remote access to the system for purposes of obtaining parking information and reserving and paying for spaces.

One aspect of the present invention is to detect the location of available parking spaces and communicate this information to vehicle operators. In accordance with this aspect of the invention, sensing devices are provided to locate vacant parking spaces and signalling devices or indicator means are provided to generate signals designating the presence of vacant spaces. The signalling devices communicate signals regarding the availability of each of the spaces in an area beyond that immediately adjacent to the available space. Accordingly, parking spaces are made easier to find because vehicle operators are signalled as to the position of available spaces from a greater distance than could be determined in the absence of the signalling devices.

Another aspect of the present invention is to calculate and generate a summary of parking availability information and to communicate this information to vehicle operators both at the facility and to those operators away from the facility should they call or otherwise request this information. In accordance with this aspect, sensing devices are provided to monitor the entry and departure of vehicles from predetermined parking areas. In further accordance with this aspect, a summary of the available parking spaces in the facility is calculated by a control unit and displayed to vehicle operators entering the facility; similarly, this information is also available at remote locations from the facility via a telecommunications interface which allows prospective users of the facility to query parking availability from a remote location.

A further aspect of the present invention is to allow prospective users of the facility to reserve vacant spaces prior to their arrival at the facility. In accordance with this aspect of the invention, prospective uses of the facility contact a control unit, such as a computer, via the telecommunications interface from remote locations, and the control unit will accept and record a unique identifier associated with that prospective user in order to reserve a parking space. Consequently, whether the prospective user actually uses the reserved space or not, the unique identifier of the prospective user is recorded so that he can be billed accordingly.

A more complete appreciation of the present invention and its scope can be obtained from understanding the accompanying drawings, which are briefly summarized below, the following detailed description of a presently preferred embodiment of the invention, and the appended claims.

DETAILED DESCRIPTION

Figure 1:
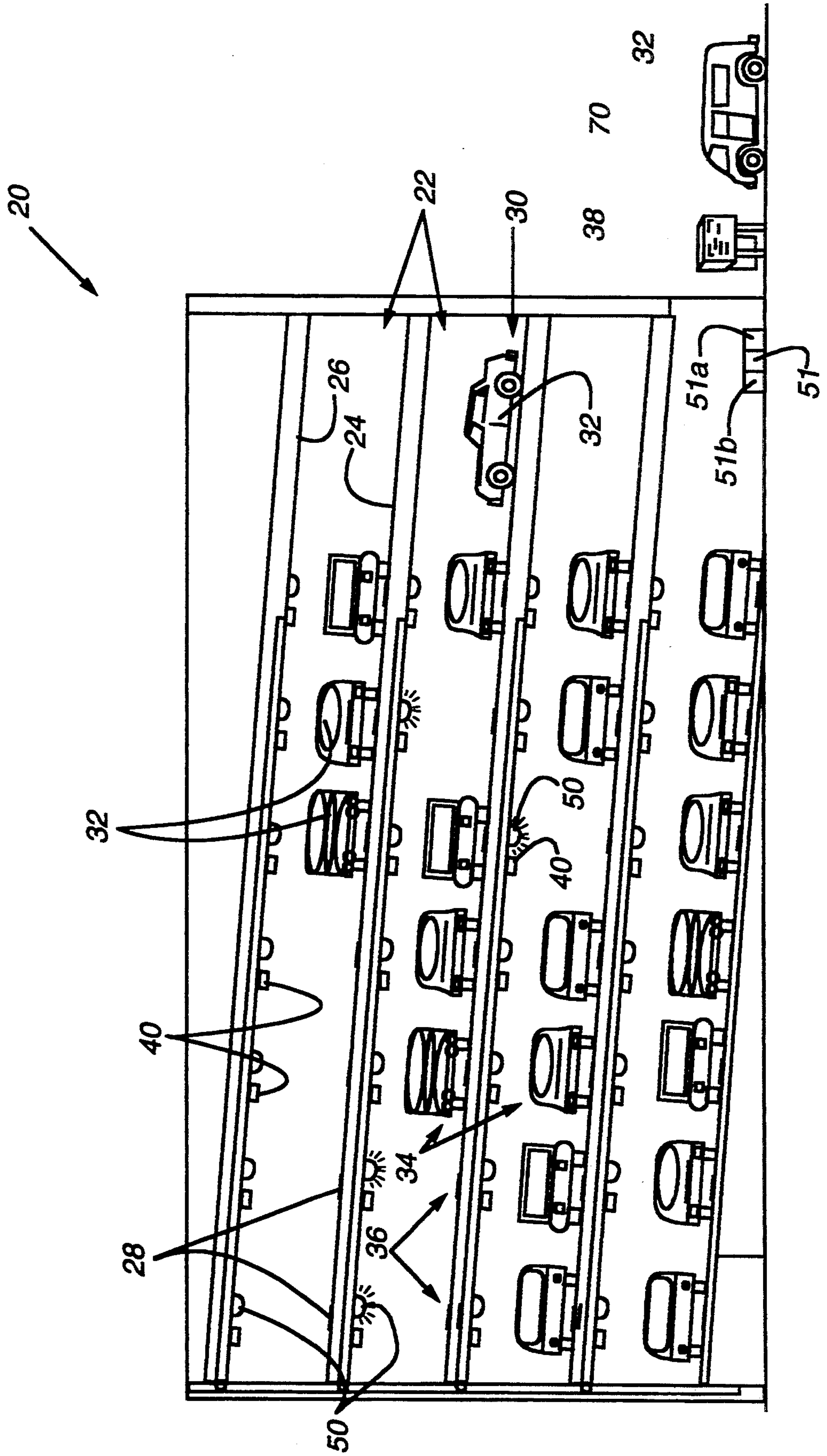
FIG. 1 is a generalized side elevation view of a typical multilevel parking facility with which there is employed a system for facilitating and monitoring vehicle parking incorporating the present invention.

The present invention is intended primarily for use in a parking facility, for example a multi-level parking garage 20 shown in FIG. 1. The garage 20 has a number of parking levels 22 defined generally by a floor 24 and a ceiling 26. Each level 22 contains a plurality of parking spaces 28, as well as aisles 30 to permit movement of vehicles 32 among the spaces 28. The parking spaces 28 are occupied by parked vehicles 32 (shown at 34) or they are unoccupied (shown at 36). The garage 20 has at least one entrance 38 for vehicles 32 to enter and ramps for vehicles 32 to move both upwardly and downwardly between the levels 22.

Operators drive the vehicles 32 into the garage 20 at the entrance 38 seeking unoccupied parking spaces 36. The vehicles 32 move through aisles 30 of each level 22, while their operators visually search for available, unoccupied spaces 36 among the occupied spaces 34, until an unoccupied parking space 36 is found. Finding available parking is facilitated and monitored by the present invention in the manner discussed below.

Figure 2:
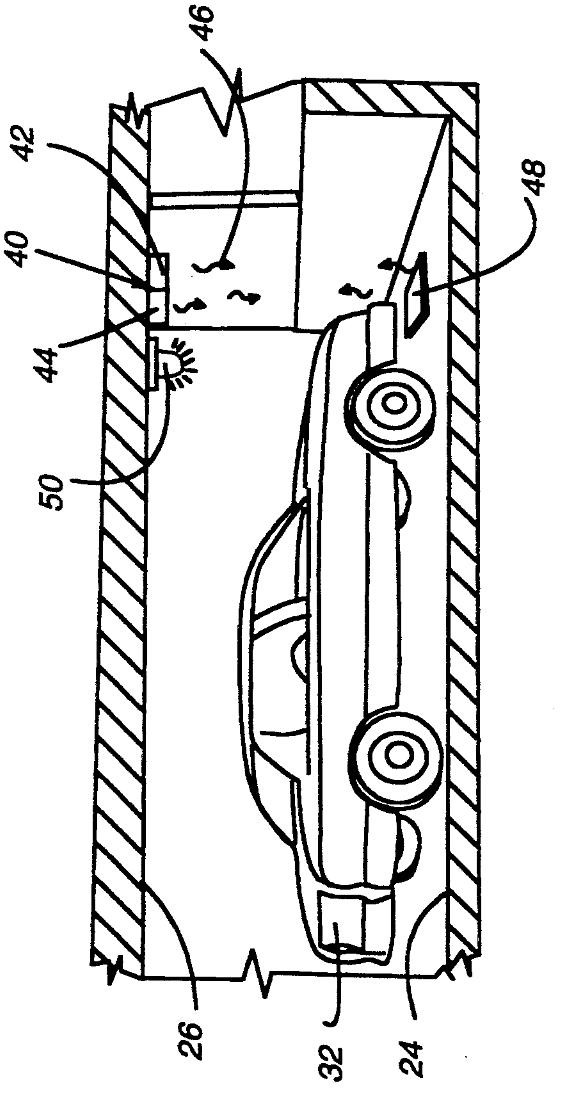
FIG. 2 illustrates a singular parking space and a vehicle entering the space of the facility shown in FIG. 1, and sensing means and signalling means associated with the parking space, both of which are a part of the system shown in FIG. 2.
Figure 3:
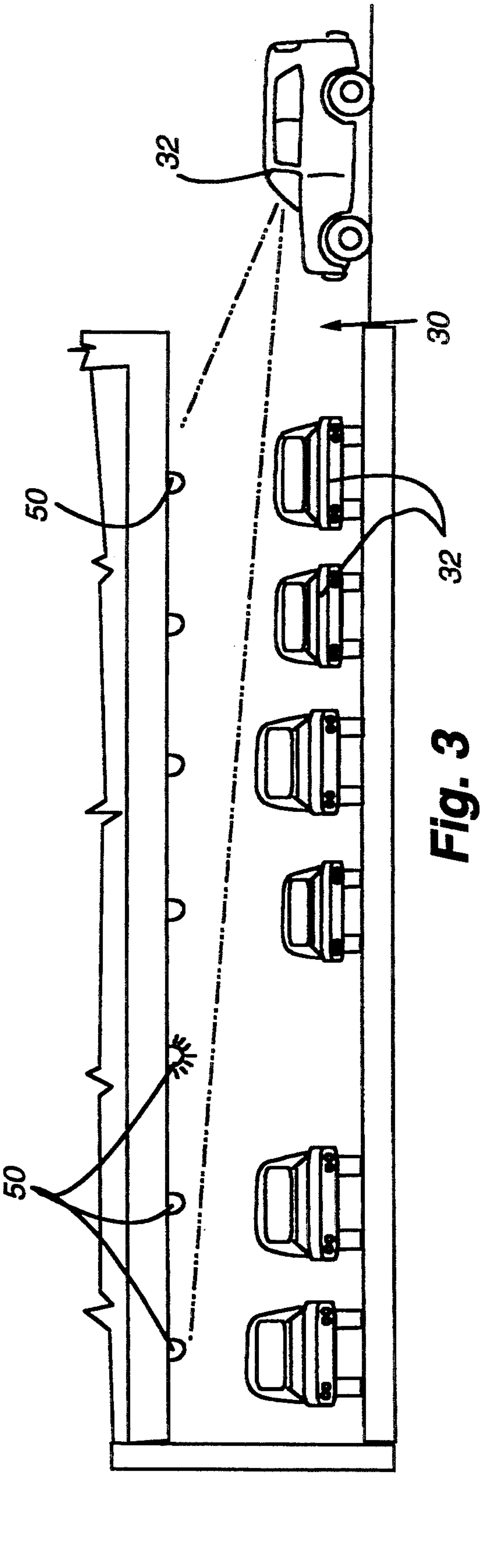
FIG. 3 is an enlarged view of a portion of a parking facility shown in FIG. 1 illustrating the positioning of the sensing and signalling devices of the system shown in FIG. 2 relative to a number of singular spaces of the type shown in FIG. 3.

As shown in FIGS. 1 and 3, each parking space 28 is equipped with a vehicle sensing means or device 40 which is preferably mounted on the ceiling 26 of the parking level 22. In a preferred embodiment, the sensing device 40 includes an infrared transmitter 42 and a receiver 44, as shown in FIG. 2. The transmitter 42 emits an infrared beam 46 which, when no vehicle occupies the space, is reflected by a reflector 48 and returned to the receiver 44 mounted adjacent the transmitter 42. The receiver 44 detects the reflected light from the beam 46 and generates a state signal or availability to indicate that the space is an unoccupied space 36 (FIG. 1). If, however, a vehicle 32 is parked in the parking space 28, the beam 46 emitted by the transmitter 40 is blocked from reaching the reflector 48 by the presence of the vehicle 32 in the space 28. The emitted beam 46 does not reach the reflector 48 and, therefore, no light reflected by the reflector 48 back to the receiver 44. In this situation, the receiver 44 generates a different state signal to indicate that the space is an occupied space 34 (FIG. 1).

Each parking space 28 also has associated with it a signalling device 50, as is shown in FIGS. 1, 2 and 3. The signalling device 50 is preferably mounted on the ceiling 26 adjacent to the sensing device 40 or, alternatively, in the aisle 30 in front of the space 28 where the device 50 can easily be perceived at a distance by an approaching vehicle operator. When activated, the signalling device 50 preferably indicates that the space associated with the signalling device 50 is not occupied; when not activated, the signalling device 50 preferably indicates that the space associated with the signalling device 50 is occupied. In this manner, the signalling device 50 is one example of indicator means for indicating the availability and occupancy of a parking space. Preferably, the signalling device 50 is a light source, although other signalling devices which generate any type of indication discernible by a vehicle operator is also suitable.

Figure 4:
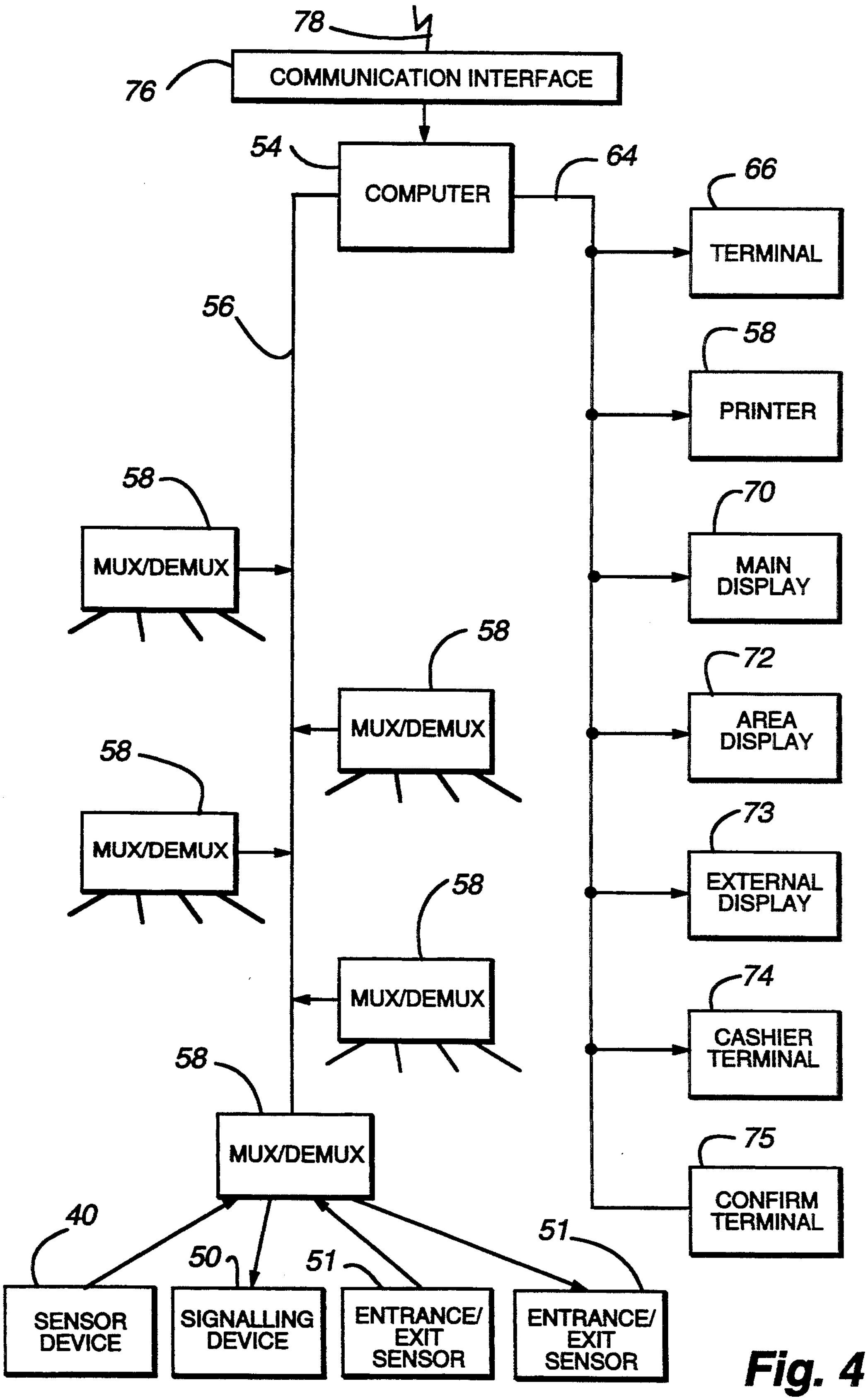
FIG. 4 is a block diagram of the system of the present invention.

As shown in FIG. 4, the indication emitted from the signalling devices 50 make it easier for the operator of the vehicle 32 to detect an unoccupied parking space. In a parking level 22 in which many of the parking spaces 28 are filled, a vehicle operator may find it difficult to find unoccupied spaces from a distance because the parked vehicles 32 create visual obstructions which may prevent the operators from seeing unoccupied spaces.

Although one sensing device 40 and one signalling device 50 is shown as separately associated with each parking space, other arrangements are possible. For example, a sensing device which is capable of sending multiple beams of light to multiple spaces and detecting light reflected from unoccupied spaces may be used. Similarly, a single signalling device capable of delivering multiple indications, one of which is separately associated with each space, may also be employed. Whatever arrangement of sensing and signalling devices is employed, however, a separate state signal should be generated to represent the occupied or unoccupied status of each space individually and distinctly from all other spaces. In addition, a separate indication should be generated by each signalling device to indicate the occupied or unoccupied status of each space individually and distinctly from all other spaces.

Entrance/exit sensing devices 51*a* and 51*b* are located at each entrance 38 and exit of the garage 20 as shown in FIG. 1. Each of the entrance/exit sensing devices 51*a* and 51*b* are paired to deliver two types of signals when the sensing devices are triggered in sequence. The entrance/exit sensing devices 51*a* and 51*b* are positioned so that an entering vehicle 32 moving in the predetermined entering direction will trigger the sensor device 51*a* before triggering the sensor device 51*b*, as shown in FIG. 1. In this manner an entrance signal is generated to indicate that the vehicle is entering the garage 20. Similarly the entrance/exit sensing devices 51*a* and 51*b* will be triggered in reverse when a vehicle is moving in a predetermined opposite direction and is exiting the level 22, as shown in FIG. 1. In this manner an exit signal is generated to indicate that a vehicle is leaving the garage 20.

The sensing devices 51*a* and 51*b* are typically combined in a single entrance/exit sensor 51. The relative timing of the triggering of the devices 51*a* and 51*b* is recognized and distinguished in order to generate an entrance signal or an exit signal. The circuitry for recognizing relative timing and generating the entrance or exit signals based on this relative timing is readily derived by one having ordinary skill in this art.

Although a single entrance/exit sensor 51 (formed from the devices 51*a* and 51*b*) is shown in FIG. 1 as located only at the entrance 38 to the garage 20, entrance/exit sensors 51 could be employed at separate parking areas within the larger garage, for example at each level 22 of the garage 20. In this manner the number of vehicles 32 entering or leaving each separate area of the garage can be separately monitored.

The activation of each signalling device 50 is controlled by a control system 52, shown in FIG. 4. Each signalling device 50 is caused to provide an indication or not to provide an indication in response to the state signals generated by the sensing devices 40 associated with each space 28, as in described below in conjunction with FIGS. 5A and 5B.

A presently preferred embodiment of the control system 52 employs a central controller such as a computer 54, as shown in FIG. 4. A data communications bus or network 56 connects the computer 54 to a number of communications interfaces, for example multiplexer-demultiplexer ("mux-demux") devices 58. The sensing devices 40 and the signalling devices 50 are also connected to the mux-demux devices 58. The sensing devices 40 supply the state signals to the mux-demux devices 58 indicating the presence or absence in a vehicle 32 in each parking space. The mux-demux devices 58 deliver the activation signals indicator signals to the signalling devices 50 to cause them to indicate the presence of an available parking space or to indicate the occupancy of a parking space. Accordingly, the communications network 56 and the mux-demux devices 58 allow the computer 52 to collect data in the form of the state signals from the sensing devices 40 and transmit data in the form of the activation signals to the signalling devices 50.

The functionality of the mux-demux devices 58 is controlled by control signals supplied by the computer 54 over the network 56 to each mux-demux device 58. The control signals cause the mux-demux device 54 read and communicate back to the computer the availability signals supplied by the sensing devices 40 associated with each particular parking space. It is thereby possible to ascertain the occupied or unoccupied status of each parking space. The computer 54 transmits control signals in a predetermined order to poll all of the sensing devices and receive the state signals associated with each of the parking spaces in the garage 20. In this manner the computer 54 polls the availability of each of the parking spaces, and records the availability status of each parking space in accordance with the state signals received during each polling interval. Preferably the polling intervals occur on a regular basis at relatively frequent time intervals. Routines for generating control signals to achieve regularly-occurring polling intervals are well known in network communications systems.

Once the availability status of each individual parking space has been ascertained, the computer 54 supplies control signals over the network 56 to each mux-demux device 58 to direct the activation signals supplied by the computer 54 to the signalling devices 50 associated with each particular parking space. Preferably, the computer 54 generates an activation signal for each signalling device 50 associated with each of the parking spaces which are indicated as unoccupied, and the computer 54 generates another type of activation signal associated with each of the parking spaces which the sensing devices 40 have indicated are occupied. Upon receipt of an activation signal of the type indicating an unoccupied space, the signalling device 50 is caused to generate an indication of an available space. Preferably, the signalling devices are controlled to generate the appropriate indications each time the sensing devices 40 are polled. The mux-demux devices 58 allow the computer 54 to individually address the availability signals to individual signalling devices.

The network 56 connecting the computer 54 to each of the mux-demux devices 58 may be a hard-wired multiconducter bus having enough individual conductors to allow the computer 54 to send and receive sufficient control and data signals to individually address and poll each of the sensing devices 40 and to address and transmit activation signals to each of the signalling devices 50. Alternatively, the network 56 and mux-demux devices 58 may be a conventional local area network in which a single conductor forms a communication medium and an interface is employed in place of the mux-demux devices 58 to selectively connect the medium and the computer 54 to the sensing devices 40 and signalling devices 50 in accordance with a communications protocol.

In a similar manner, each of the entrance/exit sensors 51 is polled to receive the entrance and exit signals. Depending on the type of communications protocol which will be employed for polling, the state signals from each of the sensing devices might be interrogated on a regular pattern, such as in numerical order. Other types of communications protocol might poll only those sensing devices for which a change in the state signal occurs. In the case of regular rotation polling protocols, the time internal of the polling should be sufficiently short so that the entering and exiting vehicles at each of the entrance/exit sensors 51 can be reliably detected.

Another communications network 64 or bus connects the computer 54 to a conventional interactive computer terminal 66 and a printer 68. The terminal 66 allows the garage management personnel to enter information and programming into the computer in order to control the computer's operations. The terminal 66 and printer 68 also allow the management personnel of the garage 20 to extract information collected by the computer 50 concerning parking availability and usage.

Also connected to the network 64 are a main display 70, one or more area displays 72, and an external display 73. The main display 70 is preferably similar to that shown in FIG. 1 and is positioned at the entrance 38 of the garage 20 where it may advantageously communicate parking availability information to vehicle operators entering the garage 20. The main display 70 preferably gives vehicle operators information about the availability of parking spaces in each area or level 22 of the garage 20 and of parking availability master availability in the garage 20 as a whole. The area displays 72 are located at various locations within the garage 20, for example, at the entrance ramp to each level 22 (FIG. 1). The area displays 72 communicate parking availability information to vehicle operators relative to the parking availability within the area itself. The main display 70 and the area displays 72 may inform vehicle operators of the availability of parking by presenting the percentage occupancy of each level 22 or by displaying the actual number of available parking spaces on each level 22, for example. The external display 73, located on the exterior of the garage 20, indicates to vehicle operators outside of the garage at a distance well beyond the entrance 38, the total spaces available within the garage 20. Vehicle operators observing the external display 73 are able to make decisions about attempting to park in the garage 20 without attempting to enter the entrance.

Also connected to the data communications network 64 are a cashier's terminal 74 and a confirmation terminal 75. The cashier's terminal 74 is an ordinary interactive terminal having a keyboard and a display capable of displaying alphanumeric symbols. The confirmation terminal 75 is a limited-function terminal capable with a numeric keyboard operable to receive a sequence of numbers, an alphanumeric display operable to communicate a brief message and a limited function printer capable of generating a ticket or a receipt.

A telecommunications interface 76 is also connected to the computer. A public or private communications network or system 78, such as a public telephone network or the like, is connected to the telecommunications interface 76. The telecommunications interface 76 allows the computer 50 to transmit and receive data over the public data communications system. As will be described in greater detail below, the telecommunications interface 76 allows the computer 54 to exchange data with prospective users of the garage 20 to ascertain the quantity of available parking spaces, optionally to reserve a parking space without travelling to the garage 20, and to pay for parking which has been reserved.

The nature of the functionality of the system 52 is achieved primarily from programming of the computer 54 and the interconnection of the elements. This functionality, and an illustration of the programming of the computer is explained in terms of six separate and different routines shown generally in FIGS. 5A, 5B, 6, 7, 8 and 9. These routines may be executed in parallel in a multi-tasking operating environment or in sequence. The multi-tasking environment may include parallel processors within the same device, separate processors which are connected via a local area network, or the multi-tasking environment may execute on a single processor under a multi-tasking operating system such as UNIX which alternately runs and suspends tasks queued by the different routines, allowing the routines to run concurrently. Both operating environments are known in the art of computers and data processing. The steps and functionality associated with each of the routines is referenced by reference numbers in the following description.

Figure 5A:
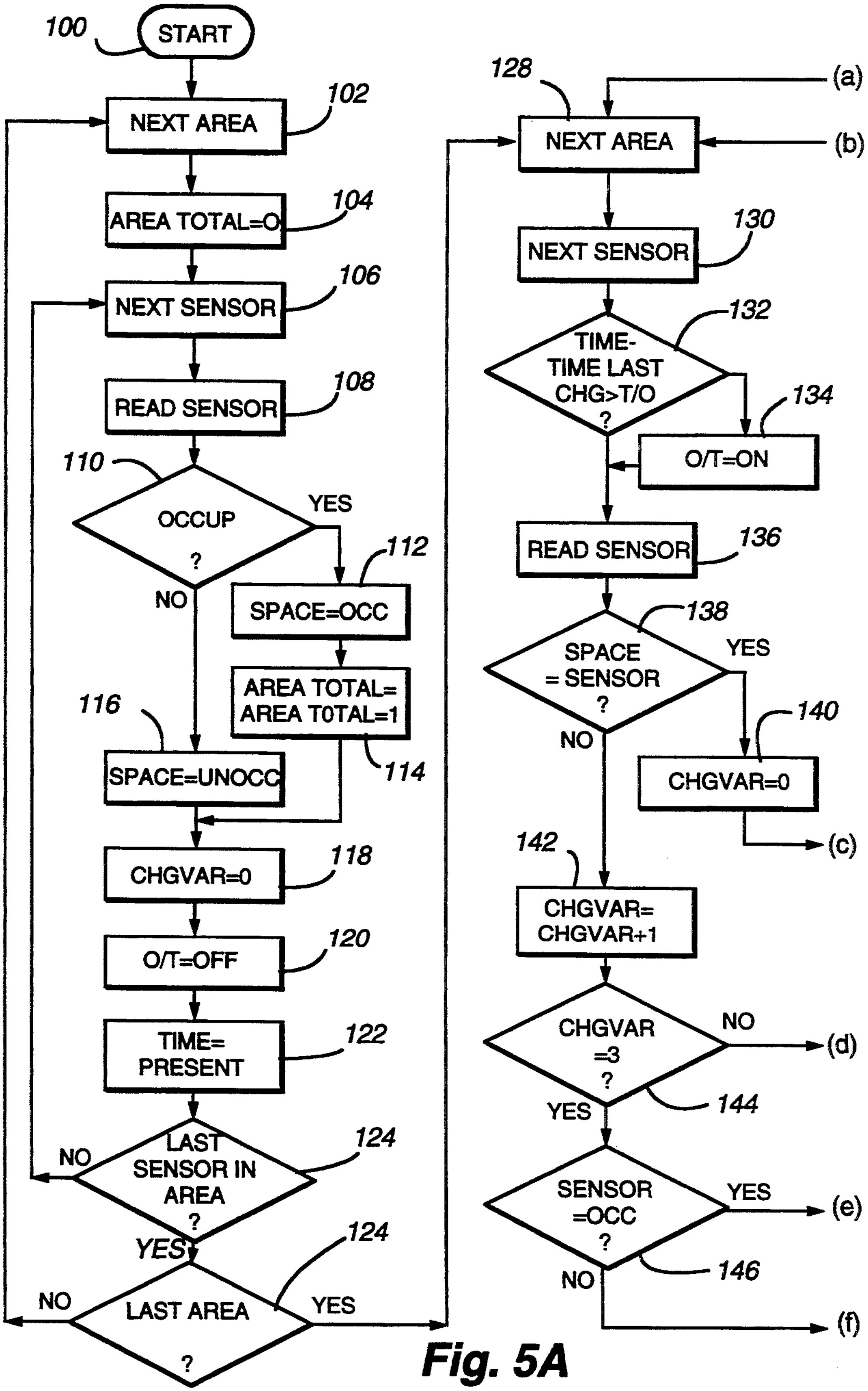
FIGS. 5A, 5B, 6, 7, 8 and 9 are flowcharts depicting the operation of the system shown in FIG. 4.
Figure 5B:
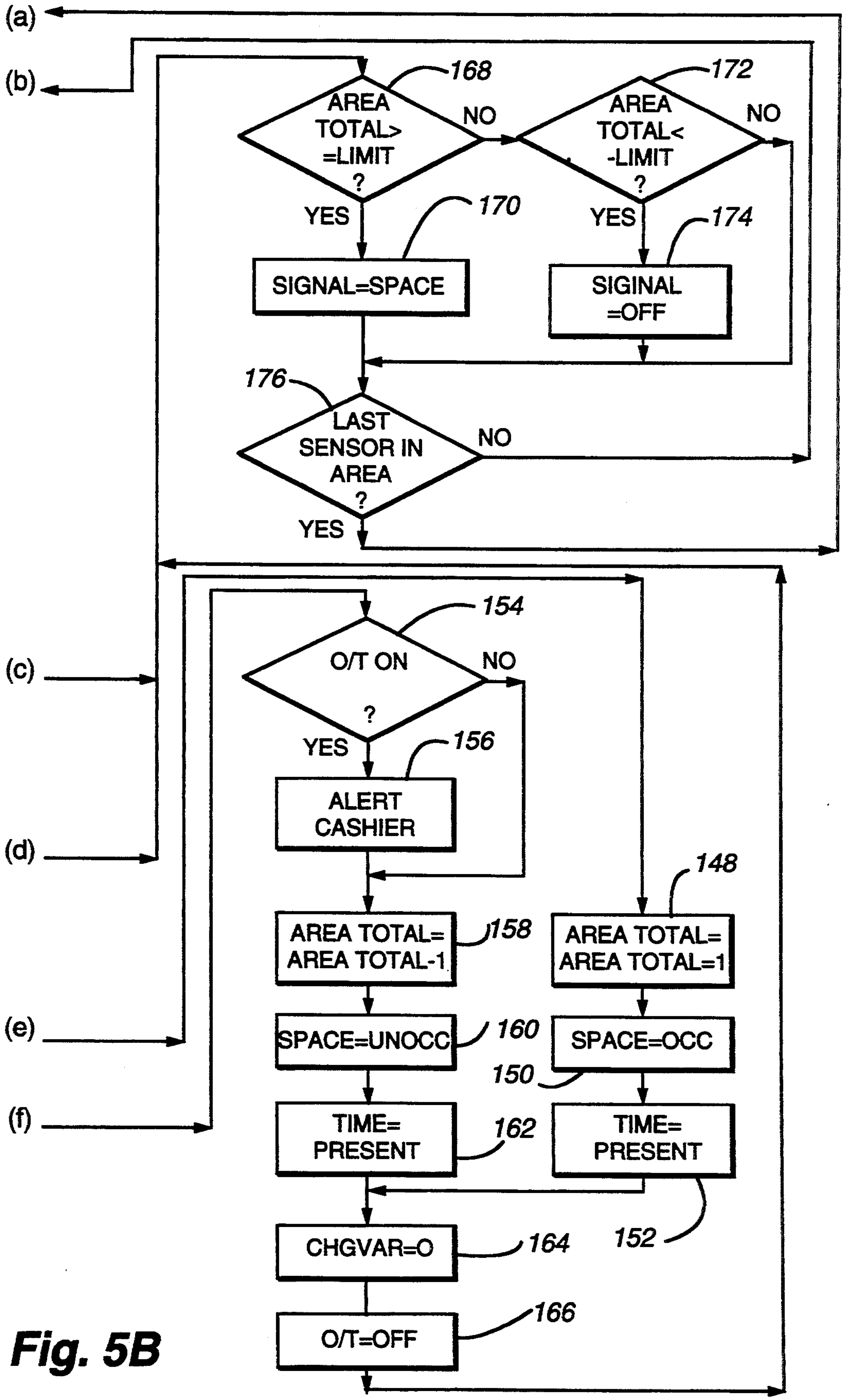

The routine for polling the sensing devices is shown in FIGS. 5A and 5B. The polling routine is run on a regularly reoccurring basis to determine the occupancy of each of the spaces and the passage of cars through the entrance/exit sensors. Upon activation 100, for each area 102, an initialization to zero 104 for the total occupancy of each area occurs. An initial polling cycle is then commenced. The computer addresses 106 and reads 108 the state signals to develop the current occupancy status 110 indicated by each of the sensing devices. If the state signal indicates the space is occupied, the status for the space is recorded 112 as occupied, and the total occupancy for that area is incremented 114. If the state signal indicates the space is unoccupied, the status for the space is recorded 116 as unoccupied. Whether the state signal indicates that the space is occupied or unoccupied, a change variable of each space is set 118 to zero, an overtime parking flag is set 120 to off, and the time of the last change is set 122 to the present time. This initialization routine is repeated for all the spaces until the last space in each area has been polled 124, and repeats for each area until all or the last area has been polled 126.

The purpose of the change variable is to eliminate errors caused by pedestrians walking across parking spaces or similar transient phenomena. After the initialization polling routine, the occupancy status of a parking space is not recorded as changed until a space has been polled on three successive cycles or intervals and the occupancy of the space has been changed to the new status on each successive polling interval.

The overtime flag allows management to check on spaces for which the status shows vehicles to have been parked in them longer than a predetermined period of time (e.g., for a business district garage, parking over twenty-four hours is not expected) and to avoid overtime parking fraud. As will be described below, if the overtime parking flag has been set for a given space, an attendant may be directed to scout each space to ensure that the sensing device is functioning correctly or to see if the operator of the vehicle needs help. If a vehicle is parked in the space, the attendant records vehicle identifying information, such as make, model, color and license plate number, and enters this information into the computer. The manner in which overtime fraud is prevented will be further discussed below.

After the initialization cycle, for each parking area 128 the occupancy of each parking space is polled 130. If a predetermined overtime interval or longer has passed between the present time and the last recorded time of a change in occupancy status for the space 132, the overtime flag is set 134 to on. The status of the sensing device is read 136, and a determination is made 138 if the previously recorded occupancy status of the space is equal to that presently indicated by the sensing device. If the previously-recorded status is the same as the status presently indicated by the sensing device, the change variable is reset 140 to zero. If the previously-recorded status is not the same as the status presently indicated by the sensing device, the change variable is incremented 142 by one. The change variable is subsequently checked 144. If the change variable is not equal to three, the previously-recorded is again checked to determine whether an activation signal should be set to activate the signalling device 50 for the space, as will be discussed below.

If, however, the change variable is equal to three, a query is then made 146 whether the space has become occupied or unoccupied. If the space has become occupied, the area total vehicle count is incremented 148, the status of the space is recorded 150 to be occupied and the time of the status change is recorded 152 as equal to the present time. On the other hand, if the space has become unoccupied, a check is made 154 to determine if the overtime flag was set to on.

If the overtime flag was set, the cashier is alerted 156 to the fact that a vehicle which was parked overtime is leaving the garage. The vehicle identifying information which has previously been entered is transmitted to the cashier's terminal. When the overtime-parked vehicle leaves the parking space, the exit cashier is presented with the identifying information. Accordingly, for example, the operator of a vehicle which has been parked in a garage for a week cannot claim he has lost his ticket and then pay only a full day's rate. Whether the overtime flag was set to on or to off, the area total count of parked is decremented 158, the status of the space is recorded 160 to be unoccupied and the time of the status change is recorded 162 as equal to the present time. In addition, whether the space became occupied or unoccupied, the change variable is reset 164 to zero and the overtime flag is set 166 to off.

Whether or not the occupancy of the space has changed, the total occupancy of each level is checked to determine if each level is sufficiently occupied to warrant activation of the signalling devices. If the occupancy level is not high enough to warrant use of the signalling devices, the signalling devices are deactivated to save energy. If the area total vehicle count exceeds a predetermined activation threshold as determined at 168, an activation signal is set 170 to reflect the negative of whatever occupancy status has been recorded for the space 170. That is, if the space is vacant, the activation signal is activated; if the space is not vacant, the activation signal is deactivated. On the other hand, if the area total is less than a predetermined deactivation threshold as determined at 172, the signal is set 174 to off. The activation threshold is higher than the deactivation threshold. Different activation and deactivation thresholds are used to avoid flickering of the signalling devices which would occur if a single threshold was used and the occupancy of the area hovered about that threshold level. Ultimately, a query is made at 176 to determine whether this is the last space in the area. The polling routine is run for each parking area or level 22 in the garage 20; once the routine has been run for each area or level, the routine repeats indefinitely until deactivated by the garage management.

Figure 6:
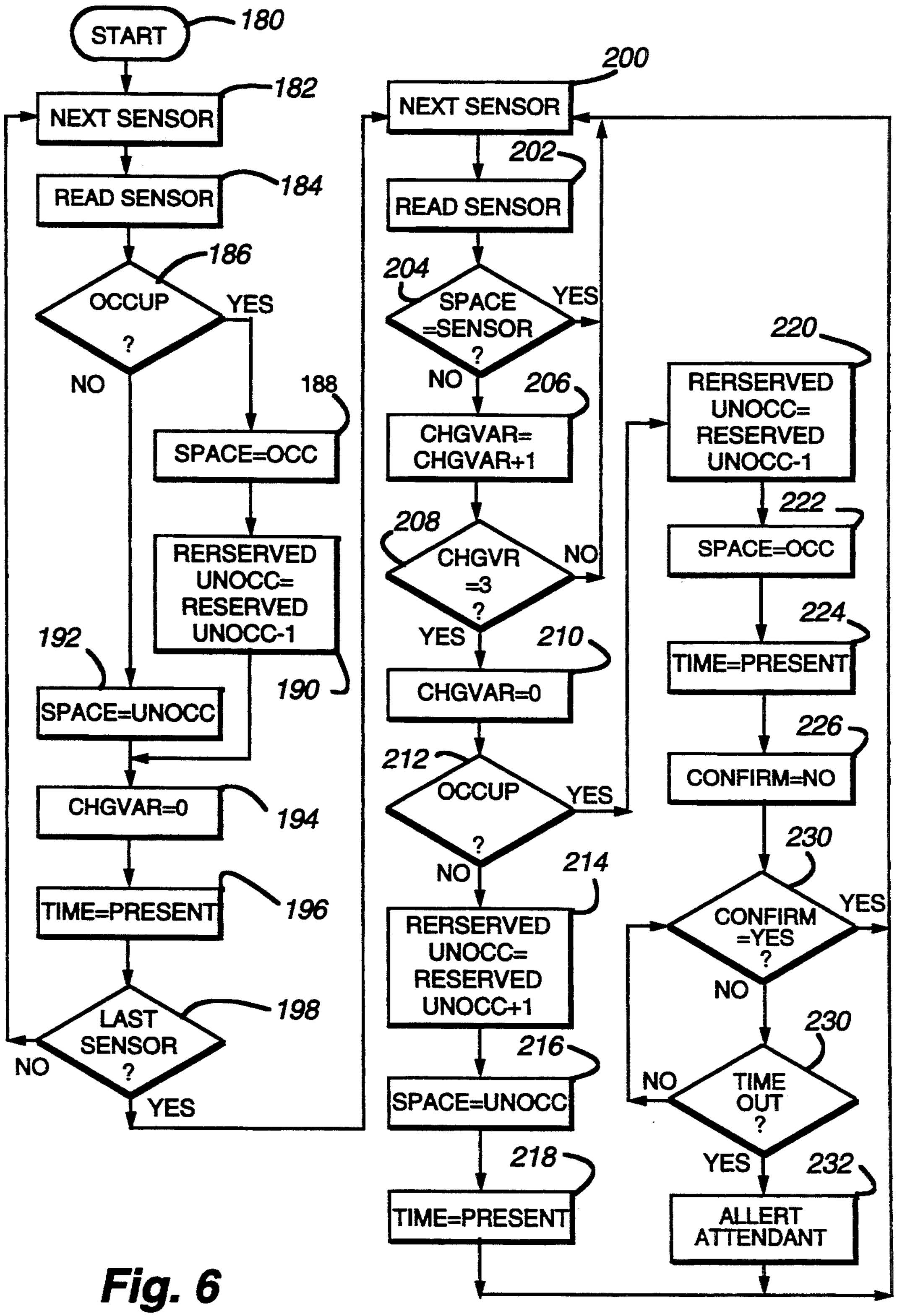

FIG. 6 illustrates the functionality of another polling routine which may be run for an area in the garage 20 which can be designated for reserved parking. More than one area may be designated for reserved parking, although only one area is so designated for purposes of explanation. This reserved parking area polling routine also is run on a regularly reoccurring basis to determine the occupancy of each of the spaces in the reserved parking area. Upon activation 180, an initial polling cycle is performed. Each sensor is read 184, addressed 182, and the state signal of the sensing devices and the current occupancy status indicated by each of the sensing devices is queried 186. If the sensing device indicates the space is occupied, that space is recorded 188 as an occupied status, and the total remaining reserved spaces is decremented 190. If the sensing device indicates the space is unoccupied, that space is recorded 192 as an unoccupied status. Whether the sensing device indicates that the space is occupied or unoccupied, the change variable of each space is reset 194 to zero and the time of last change is set 196 as the present time. This initialization routine is repeated until the last space in the reserved parking area has been polled at 198.

After the initialization cycle, occupancy of each parking space is polled 200. The status of the sensing device is read 202, and a determination is made 204 if the previously recorded occupancy status of the space is equal to that presently indicated. If the previously-recorded status is not the same as the status presently indicated by the sensing device, the change variable is incremented 206. Subsequently, the change variable is checked 208. If the change variable is not equal to three, the routine continues on to query the status of the next space.

If, however, the change variable is equal to three, the change variable is then reset 210, and a determination 212 is made whether the space has become occupied or unoccupied. If the space has become unoccupied, the reserved area total is incremented 214, the status of the space is recorded 216 to be unoccupied and the time of the status change is recorded 218 as equal to the present time.

On the other hand, if the space has become occupied, the reserved area total is decremented 220, the space is recorded 222 as being occupied, and the time of the status change is recorded 224 as equal to the present time. As will be further described below, a person parking in a reserved parking space is required to be able to present information confirming that he is entitled to use the reserved space. Once the space first becomes occupied, the confirmation status initially is reset 226 to no. A query is then made 228 to determine if the confirmatory information has been correctly entered, causing a confirmation flag to be set to yes. The polling repeats waiting for the confirmation information until it reaches the end of a predetermined time out period established at 230 during which the vehicle operator is required to input the confirming information. If the information has not been entered within the time out period established at 230, a garage attendant is alerted to investigate 232.

Figure 7:
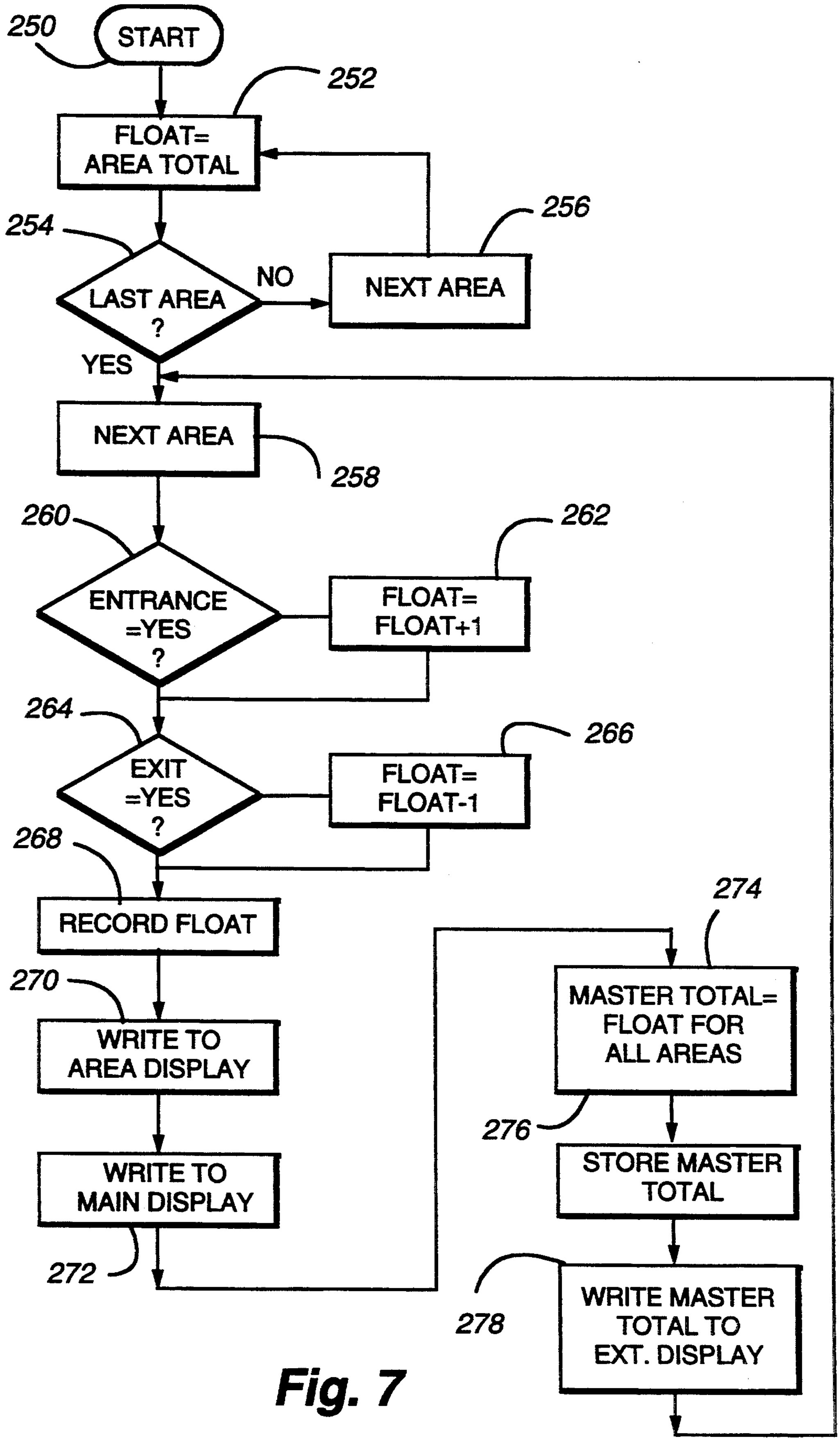

After the polling routines have been initialized as described above, a counting routine is executed which calculates the total number of parking spaces in each area which should be available to a prospective user of that area. The counting routine is shown in FIG. 7. The counting routine totals the number of vehicles which have entered the area and subtracts from that the number which have departed from that area. The number of cars, including both those parked in a given area and those searching for a space in a given area is known as a float total.

Upon activation 250 of the counting routine, the float total for each area is set 252 equal to the area total obtained upon initialization of the polling routines. Until the last area has been initialized 254, each area is initialized 256. Once all levels have been initialized, information for the next parking area is accessed 258. The entrance/exit sensor at the entrance is queried 260 to determine if a vehicle has just entered the area. If so, the float count is incremented 262. Similarly, the entrance/exit sensor at the exit is queried at 264 to determine if a vehicle has just left the area. If so, the float count is decremented 266. The float count for the area is recorded 268, is written 270 to the area display so that those entering the area are informed of the latest float count, and the float for the area is also written 272 to the main display so that those entering the garage 20 are informed as to the parking availability of each area. Additionally, the float counts are totalled 274 for the entire garage 20 to obtain a master total float. The master total float is stored 276 and written 278 to the exterior display of the garage so that vehicle operators can see how many parking spaces are left available in the garage 20. This counting routine executes indefinitely or until stopped by garage management personnel.

Figure 8:
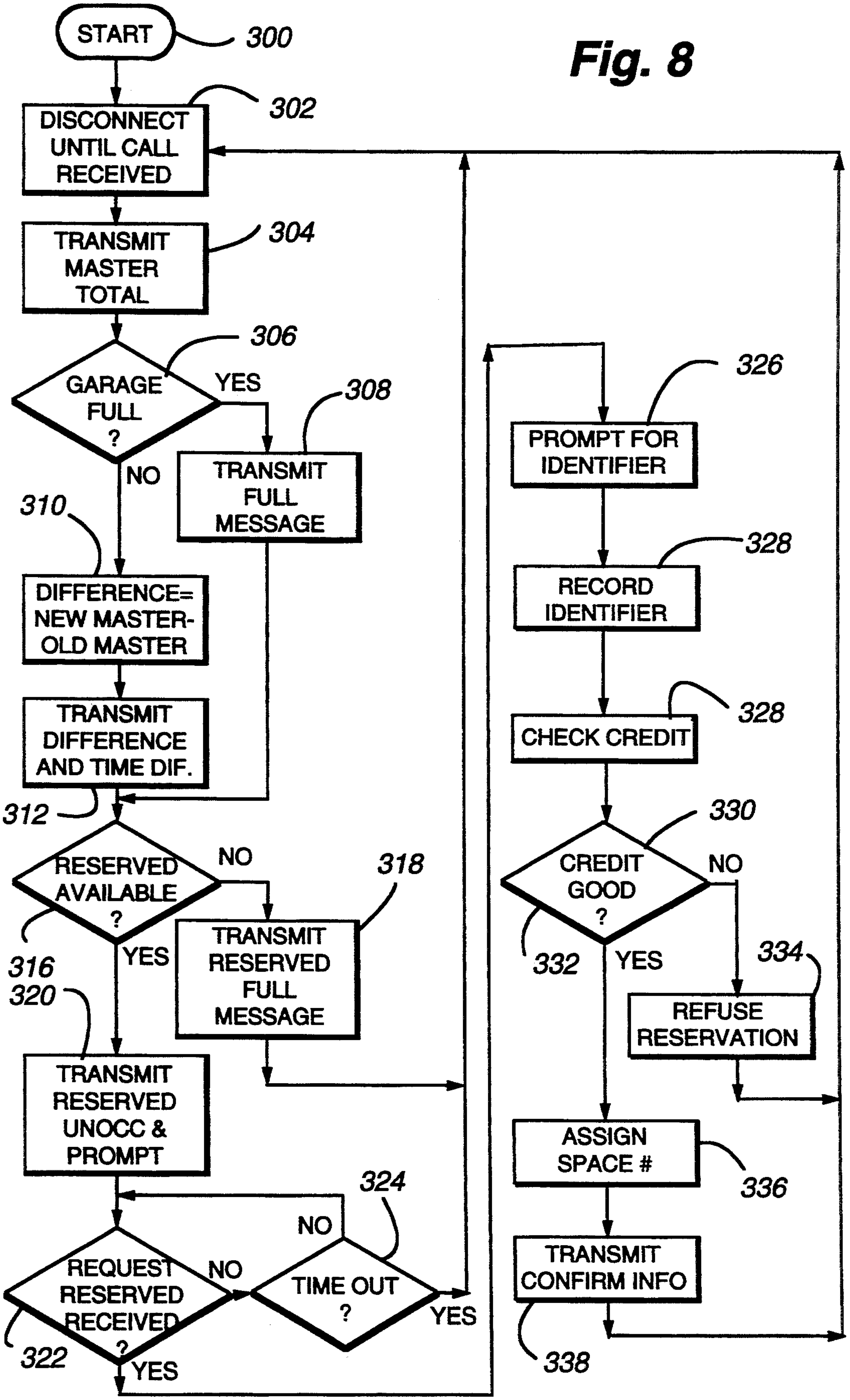

A routine for providing parking occupancy reports and for accepting reservations over the public communications network is shown in FIG. 8. Once activated 300, a standby mode is entered with the public communications network disconnected until an incoming call is received 302. Upon receiving a call, the master float total is transmitted 304 to the caller through the digitized voicing device 304. A query is then made 306 to determine whether the garage 20 is full. If the garage 20 is full, a message is transmitted 308 to the caller indicating the garage 20 is full. However, if the garage 20 is not full, the difference is calculated 310 between the last recorded master float total and a master float total which was previously recorded. The difference in time between the recording of the two master float totals also is determined 312. The master float totals may be recorded at predetermined intervals or "pushed" onto a master float total stack. Once both the float total difference and time difference have been calculated, this information is transmitted 314 to a caller so the caller knows not only how many spaces are left in the garage 20, but also how quickly the garage 20 is filling.

Whether the garage 20 is filled or not, a determination 316 is made whether there is reserved parking available. The caller is informed 318 whether or not there is reserved parking available 318. The caller is also informed 320 how he can reserve such a space, preferably by pressing one of the numeric buttons on the phone to generate a touch tone. A determination is made 322 whether a reservation request is received. If not, a predetermined time out interval is allowed to elapse 324 and then the caller is disconnected.

On the other hand, if the caller has indicated that he wishes to reserve a space, the caller is prompted to enter 326 via touch-tones a unique identifier. This unique identifier is for billing purposes and may represent a credit card number or a preestablished charge account with the garage 20. Once the identifier is entered, it is recorded 328. A check of the caller's credit/account balance is made 330 to ensure that the intended method of payment is valid. Computerized credit checking is well known. A determination 332 is then made whether the credit check is satisfactory. If credit is not satisfactory, the reservation is refused 334. However, if the credit offered is acceptable, the caller is given 336 a reserved space number and told 338 what confirmatory code or information he must provide upon arriving at the garage 20 to secure the reserved space. This confirmatory information may consist, for example, of the last several digits of the credit card number or account number previously offered by the caller.

Figure 9:
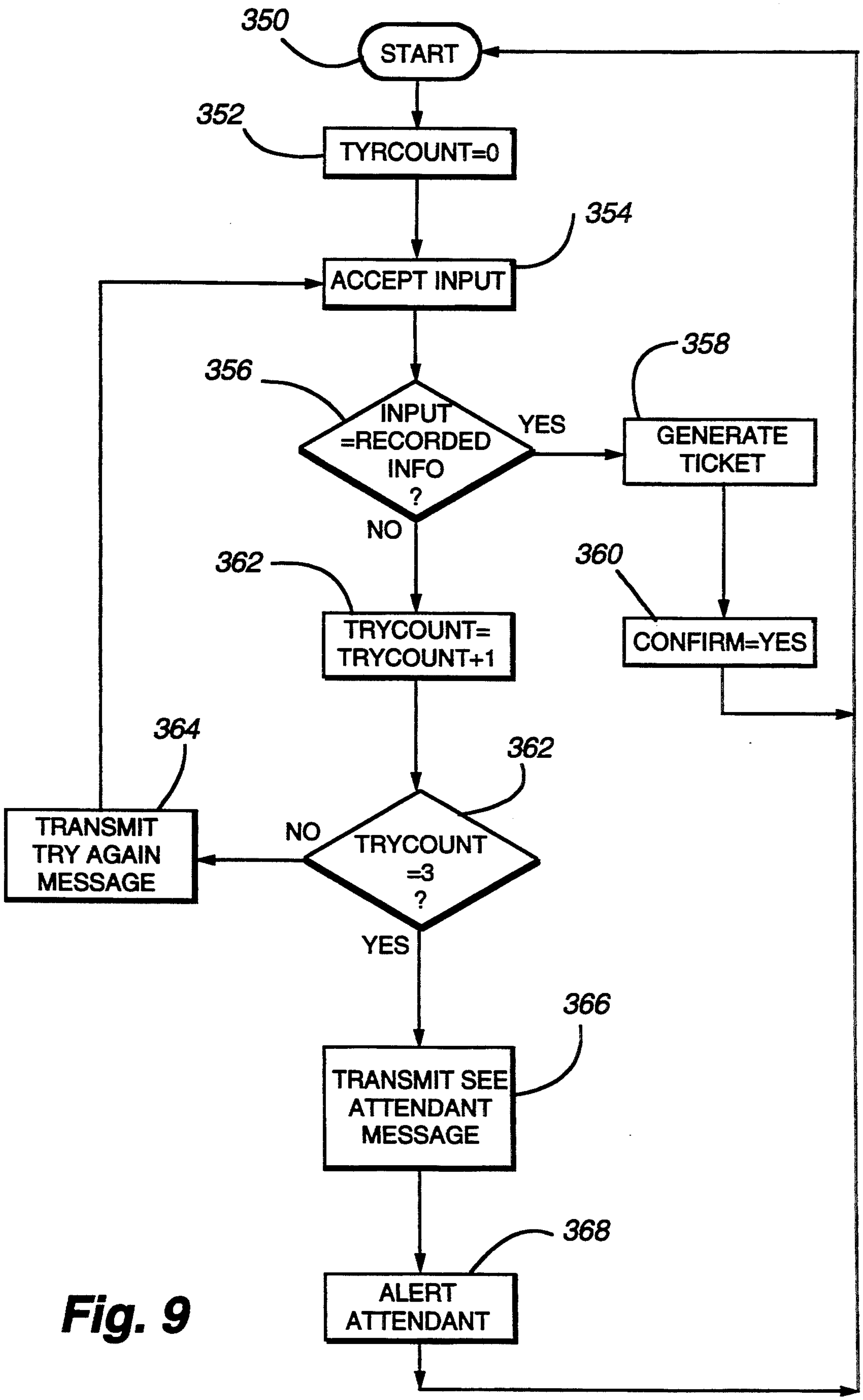

An interrupt/standby type routine as illustrated in FIG. 9 to show how the confirmatory information is entered. Once information is received at the confirmation terminal starting 350 the routine, the reserved parker is permitted three attempts to enter the correct confirmation information. A counter is set 352 to track these attempts. The entered information, including the parking space number and confirmation information, is accepted 354 by the system. If the confirmation information conforms with the reservation information as determined at 356, the confirmation flag is set 358 to yes and a ticket is generated at 360 which the user can give to the cashier upon leaving the garage 20 to indicate that payment has been pre-arranged. On the other hand, if the confirmation information entered at the terminal does not agree with the reservation information, the attempt counter is incremented 362. If the count has not reached three as determined at 362, the user is given another opportunity 364 to enter the information. However, if the user exhausts all three attempts, the terminal instructs the user to wait for an attendant 366 and an attendant is alerted 368 to a potential problem.

The other typical routines (not shown) are ad hoc query, reporting and input functions. From the management terminal, garage personnel can query occupancy status of the garage 20. Reports of spaces flagged for overtime parking can be retrieved. Those spaces are scouted, and, if the space is occupied, the descriptive information is entered about the vehicle which will subsequently be relayed to the cashier to avoid overtime parking fraud. Discrepancies in occupancy status resulting from inoperative sensing devices, unaccounted for transitory phenomena and other events can be corrected. Also, bills can be generated or charges transmitted to credit card companies for reserved parking.

The present invention enhances the parking process for both vehicle operators and garage management personnel. The present invention provides information to vehicle operators concerning overall availability of parking spaces in a parking garage, where in the garage available parking spaces are located and directs vehicle operators to the available spaces. With this information, as compared to garages not equipped with the present invention, vehicle operators can make informed decisions instead of guess as to where to park and can more quickly and easily locate parking spaces. Further, vehicle operators can receive information concerning space availability before arriving at the garage, allowing vehicle operators to make informed parking decisions in advance, and, when appropriate, reserve remaining available parking spaces to ensure the availability of a space. In addition, garage management personnel is provided with detailed information concerning parking usage and density in order to better manage the garage.

A presently preferred embodiment of the present invention and many of its improvements have been described with a degree of particularity. This description has been made by way of preferred example. It should be understood, however, that the scope of the present invention is defined by following claims, and not necessarily by the detailed description of the preferred embodiment.

The invention claimed is:

1. A system for determining and indicating to operators of vehicles availability of predetermined individual spaces for parking vehicles in a vehicle parking facility, comprising:

sensing means for determining presence and absence of said vehicles in said spaces and for generating an availability signal indicative of the absence of vehicles in said spaces;

indicator means situated proximate to said spaces and operative upon receipt of an indicator signal for directing said operators to said spaces in which said sensing means has determined a vehicle to be absent; and control means connected to the sensing means and the indicator means and operative for polling each sensing means of the facility during each of a plurality of re-occurring repetitive intervals, for receiving the availability signal of each sensing means polled during each of said intervals, for determining the availability of said spaces in response to the availability signal, for generating said indicator signal corresponding to said spaces which are available, and for periodically addressing each indicator means and supplying the indicator signal to the addressed indicator means.

2. A system as defined in claim 1, wherein:

said sensing means is a transducer located within each of said individual spaces.

3. A system as defined in claim 1, wherein:

said indicator means includes a light source located proximate to each of said individual spaces.

4. A system as defined in claim 1, wherein:

said indicator means includes a display means operative for displaying information relating to a number of available spaces; and wherein:

the control means is further operative for generating from each of said availability signals a status signal and for storing said status signal representative of the available and occupied status of each of said spaces, and for periodically tabulating from each of said status signals stored a number of vehicles parked in said spaces in a predetermined parking area of the facility, for generating an information signal related to the number of vehicles parked in said spaces in the parking area and a total number of said spaces within the parking area, and for supplying the information signals to the display means; and the display means responding to the information signals supplied by the control means to display information describing the number of available spaces in the parking area, and said display means situated to direct said operators to said available spaces.

5. A system as defined in claim 4, wherein:

the predetermined parking area comprises all of the spaces in the facility.

6. A system as defined in claim 4, wherein:

said spaces of the facility are divided into a plurality of predetermined parking areas, each of said parking areas including a plurality of spaces; and the display means displays information describing the number of available spaces in each predetermined area of the facility, and said display means situated to direct said operators to each of said predetermined areas of the facility in which there are available spaces.

7. A system as defined in claim l, wherein: said vehicle parking facility has a plurality of parking areas each parking area has an entrance and exit through which vehicles enter and depart the parking area, and wherein:

at least one of said sensing means has a location at the entrance and exit of said areas and is operative for determining and generating an entry signal indicative of the entry of the vehicles into the parking area and is further operative for determining the departure of vehicles from the parking area and generating an exit signal indicative of the departure of the vehicles from the parking area;

the control means is receptive of the entry and exit signals and is operative in response thereto to calculate a net number of said vehicles in the parking area and the number of available spaces in the parking area, to supply said information signal related to at least one of a group consisting of the net number of vehicles in the parking area and the number of available spaces in the parking area; and wherein said indicator means includes a display means which responds to the information signal by displaying information related to at least one of a group consisting of the net number of vehicles in the parking area and the number of available spaces in the parking area.

8. A system as defined in claim 7, wherein:

the control means calculates the net number of vehicles in the parking area by determining the difference of entry signals and exit signals.

9. A system as defined in claim 4, wherein:

the facility includes a plurality of separate parking areas, and wherein:

the control means calculates a master availability number representing the number of available spaces in the facility;

the control means supplies an information signal indicative of the master availability number; and the display means responds to the information signal by displaying information indicative of the master availability number.

10. A system as defined in claim 9, wherein:

the display means is located on the exterior of the facility at a position for observation prior to entering the facility, and the display means displays information indicative of the master availability number.

11. A system as defined in claim 10, further comprising:

a plurality of display means, and wherein:

one display means is corresponds to an entrance to each parking area for displaying information indicative of at least one of the number of available spaces in the parking area and the net number of vehicles in the parking area.

12. A system as defined in claim 9, further comprising:

a plurality of display means, and wherein:

one display means is corresponds to an entrance to each parking area for displaying information relating to at least one of a group consisting of the number of available spaces in the parking area and the net number of vehicles in the parking area.

13. A system as defined in claim 1, wherein:

the control means compares the number of vehicles parked in spaces in the parking area with the number of spaces in the parking area and supplies the indicator signal to the indicator means in the parking area only if the number of vehicles parked in spaces in the parking area reaches a predetermined threshold value relative to the number of spaces in the parking area.

14. A system for determining and indicating availability of predetermined individual spaces for parking vehicles in a vehicle parking facility, comprising:

sensing means for determining presence and absence of said vehicles in said spaces and for generating an availability signal indicative of the absence of said vehicles in said spaces;

indicator means operative upon receipt of an indicator signal for indicating the availability to park in said spaces;

control means connected to the sensing means and the indicator means and operative for polling each sensing means of the facility during each of a plurality of re-occurring repetitive intervals, for receiving the availability signal of each sensing means polled during each of said intervals, for determining the availability of said spaces in response to the availability signal, for generating said indicator signal corresponding to said spaces which are available, and for periodically addressing each indicator means and supplying the indicator signal to the addressed indicator means; and wherein:

the control means is further operative for generating from each of said availability signals a status signal and for storing said status signal representative of the available and occupied status of said spaces and for periodically tabulating from the status signals stored a number of vehicles parked in spaces in a predetermined parking area of the facility, for generating an information signal indicative of the number of vehicles parked in spaces in the parking area and a total number of spaces within the parking area; and wherein:

the control means compares the number of vehicles parked in spaces in the parking area with the number of spaces in the parking area and supplies the indicator signals to the indicator means in the parking area only if the number of vehicles parked in spaces in the parking area reaches a predetermined threshold value relative to the number of spaces in the parking area; and wherein:

the control means ceases supplying the indicator signals to the indicator means of said parking areas after having previously done so when the number of vehicles parked in spaces in the parking area reaches a second predetermined threshold value different than the predetermined threshold value first aforesaid, the second threshold value being a quantity of the number of spaces in the parking area.

15. A system as defined in claim 1, further comprising:

telecommunications interface means connecting an external communication network to the control means and operative for communicating information between the control means and the external communication network.

16. A system for determining and indicating availability of predetermined individual spaces for parking vehicles in a vehicle parking facility, comprising:

sensing means for determining presence and absence of said vehicles in said spaces and for generating an availability signal indicative of the absence of said vehicles in said spaces;

control means connected to the sensing means and operative for polling each sensing means of the facility during each of a plurality of re-occurring repetitive intervals, for receiving the availability signal of each sensing means polled during each of said intervals for determining the availability of said spaces in response to the availability signal; and wherein:

the control means is further operative for generating from each of said availability signals a status signal and for storing said status signal representative of the available and occupied status of said spaces, and for periodically tabulating from the status signals stored a number of vehicles parked in spaces in a predetermined parking area of the facility, for generating an information signal related to the number of vehicles parked in spaces in the parking area and a total number of spaces within the parking area; further comprising:

telecommunications interface means connecting an external communication network to the control means and operative for communicating information between the control means and the external communication network; and wherein:

the information communicated from the control means to the external communication network is communicated to a prospective user and indicative of availability of spaces in the facility.

17. A system as defined in claim 15, wherein the information communicated from the control means to the external communication network is communicated to a prospective user and relates to availability of spaces in the facility.

18. A system as defined in claim 17, wherein:

the information available to the prospective user comprises a master availability number.

19. A system for determining and indicating availability of predetermined individual spaces for parking vehicles in a vehicle parking facility, wherein the parking facility further includes a plurality of reservable spaces, comprising:

sensing means for determining presence and absence of said vehicles in said spaces and for generating an availability signal indicative of the absence of said vehicles in said spaces;

control means connected to the sensing means and operative for polling each sensing means of the facility during each of a plurality of re-occurring repetitive intervals, for receiving the availability signal of each sensing means polled during each of said intervals, for determining the availability of said spaces in response to the availability signal; and wherein:

the control means is further operative for generating from each of said availability signals a status signal and for storing said status signal representative of the available and occupied status of said spaces, and for periodically tabulating from the status signals stored a number of vehicles parked in spaces in a predetermined parking area of the facility, for generating an information signal related to the number of vehicles parked in spaces in the parking area; further comprising:

telecommunications interface means connecting an external communication network to the control means and operative for communicating information between the control means and the external communication network; and wherein:

the control means reserves said space for a prospective user in response to a request to reserve said space made by the prospective user over the communications network through telecommunications interface by assigning a unique identification code corresponds to the prospective user and to the spaces reserved.

20. A system as defined in claim 19, further comprising:

confirming terminal means connected to the control means and operative for allowing the user of the reserved space to enter the unique identification code upon parking the vehicle in the reserved space and for supplying an identification signal to the control means indicative of the identification code entered; and wherein:

the control means compares the identification signal with the identification code assigned upon reservation of the space and supplies an alert signal if the comparison does not match the identification signal with the identification code.

21. A system for determining and indicating availability of predetermined individual spaces for parking vehicles in a vehicle parking facility, comprising:

sensing means for determining presence and absence of said vehicles in said spaces and for generating an availability signal indicative of the absence of said vehicles in said spaces;

control means connected to the sensing means and operative for polling each sensing means of the facility during each of a plurality of re-occurring repetitive intervals, for receiving the availability signal of each sensing means polled during each of said intervals, for determining the availability of said spaces in response to the availability signal; and wherein:

the control means generates data representing utilization of the spaces and generates a report on the revenue to be collected for the utilization of the spaces.

22. A system as defined in claim 3, wherein:

the spaces in the facility are arranged in rows and aisles extending along each row of the spaces, and wherein:

each of said indicator means is positioned in the aisle in front of each of said spaces to be visible throughout the aisle.

23. A method for determining and indicating to operators of vehicles availability of spaces for parking vehicles in a vehicle parking facility, comprising:

polling said spaces in the facility during a plurality of re-occurring repetitive intervals to determine presence or absence of a vehicle in said spaces; and periodically indicating the availability of said spaces;

directing said operators to said spaces in which a vehicle has been determined to be absent, for parking a vehicle therein.

24. A method as defined in claim 23, wherein:

polling of the spaces occurs during a predetermined plurality of intervals before the availability of said spaces for parking is indicated.

25. A method as defined in claim 23, further comprising:

displaying information indicative of the number of available spaces to direct said operators to said spaces;

periodically tabulating the number of available spaces within a predetermined parking area of the facility;

developing information indicative of the number of available spaces within the parking area; and displaying the information describing the number of available spaces in the predetermined area of the facility to direct said operators to said spaces.

26. A method as defined in claim 25, wherein the predetermined parking area is all of the spaces in the facility.

27. A method as defined in claim 25, wherein said spaces of the facility are divided into a plurality of predetermined parking areas, each parking area including a plurality of spaces; and further comprising:

displaying information describing the number of available spaces in each parking area of the facility to direct operators to said spaces.

28. A method as defined in claim 25, wherein each parking area has an entrance and an exit through which vehicles enter and depart the parking area respectively, and said method further comprising:

sensing the entry of vehicles into the parking area at the entrance to the parking area;

sensing the exit of vehicles from the parking area at the exit from the parking area;

calculating a net number of vehicles in the parking area by determining the difference between the number of vehicles entering and exiting the parking area;

recognizing the number of available spaces in the parking area; and displaying information indicative of at least one of a group consisting of the net number of vehicles in the parking area and the number of available spaces in the parking area to direct said operators to said spaces.

29. A method as defined in claim 28, wherein the facility includes a plurality of separate parking areas, and further comprising:

calculating a master utilization number representing the total of vehicles in the facility by totaling the number of vehicles in each of the parking areas;

recognizing a total number of spaces in the facility;

calculating a master availability number representing the number of available spaces in the facility by determining the difference between the master utilization number and a master capacity number representing the total number of spaces in the facility;

displaying information indicative of at least one of a group consisting of the net number of vehicles in each parking area, the number of available spaces in each parking area, the master utilization number and the master available number to direct said operators to said available spaces.

30. A method as defined in claim 29, further comprising:

displaying at a location on the exterior of the facility at a position for direction of said operators prior to entering the facility, the information indicative of at least one of a group consisting of the net number of vehicles in each parking area, the number of available spaces in each parking area, the master utilization number and the master availability number.

31. A method as defined in claim 25, further comprising:

displaying at a location corresponds to the entrance to said parking area, information indicative of at least one of a group consisting of the number of available spaces in the parking area and the net number of vehicles in the parking area, to direct said operators to said available spaces.

32. A method as defined in claim 25, further comprising:

comparing the net number of vehicles parked in the parking area with the number of available spaces; and indicating availability of spaces in the parking area only if the number of available spaces in the parking area reaches a first predetermined threshold value relative to the number of available spaces in the parking area.

33. A method for determining and indicating availability of predetermined individual spaces for parking vehicles in a vehicle parking facility, comprising:

polling said spaces in the facility during a plurality of re-occurring repetitive intervals to determine presence or absence of a vehicle in said spaces;

identifying said spaces which are available during each of said intervals;

periodically indicating uniquely with respect to said spaces the availability of such spaces for parking a vehicle therein;

calculating a net number of vehicles in the parking area by determining the difference between the number of spaces in the facility and the number of available spaces; further comprising:

comparing the net number of vehicles parked in the parking area with the number of available spaces; and indicating availability of spaces in the parking area only if the number of available spaces in the parking area reaches a first (27) predetermined threshold value relative to the number of available spaces in the parking area; further comprising:

ceasing the indication of available spaces in the parking area after having previously indicated the availability of spaces in the parking area when the number of available spaces in the parking area reaches a second predetermined threshold value being different than the predetermined threshold value first aforesaid.

34. A method of determining and indicating availability of predetermined individual spaces for parking vehicles in a vehicle parking facility, comprising:

polling said spaces in the facility during a plurality of re-occurring repetitive intervals to determine presence or absence of a vehicle in said spaces;

identifying said spaces which are available during each of said intervals;

periodically tabulating the number of available spaces within a predetermined parking area of the facility;

developing information indicative of a number of vehicles parked in spaces in the parking area and a total number of available spaces within the parking area; and further comprising:

communicating information over an external communication network to a prospective user relative to the availability of spaces in the facility.

35. A method as defined in claim 34, further comprising:

requesting a reserved space in the facility by said prospective user communicating information over an external communication network;

reserving said space for a prospective user by assigning a unique identification code corresponds to the prospective user to the spaces reserved;

confirming use of the reserved spaces by the user of the reserved spaces registering the unique identification code upon parking said vehicle in the reserved spaces;

comparing the identification code registered with the identification code assigned upon reservation of the spaces; and issuing an alert if the comparison does not match the identification code entered with the identification code assigned.

36. A method for determining and indicating availability of predetermined individual spaces for parking vehicles in a vehicle parking facility, comprising:

polling said spaces in the facility during a plurality of re-occurring repetitive intervals to determine presence or absence of a vehicle in said spaces;

identifying said spaces which are available during each of said intervals; further comprising:

generating data representing utilization of the spaces and generating a report on the revenue to be collected for the utilization of the spaces.

37. A method as defined in claim 23, wherein the spaces in the facility are arranged in rows and aisles extending along each row of the spaces, and further comprising:

indicating in the aisle in front of the spaces and visibly throughout the aisle the availability of said space along the aisle to direct said operators to said space.

38. A system as defined in claim 13, wherein:

the control means ceases supplying the indicator signals to the indicator means of said parking areas after having previously done so when the number of vehicles parked in spaces in the parking area reaches a second predetermined threshold value different than the predetermined threshold value first aforesaid, the second threshold value being a quantity of the number of spaces in the parking area.

39. A system as defined in claim 15, wherein the parking facility further includes a plurality of reservable spaces and wherein:

the control means operatively reserves said space for a prospective user in response to a request to reserve said space made by the prospective user over the communications network through telecommunications interface by assigning a unique identification code indicative of the prospective user and to the spaces reserved.

40. A system as defined in claim 39, further comprising:

confirming terminal means connected to the control means and operative for allowing the user of the reserved space to enter the unique identification code upon parking the vehicle in the reserved space and for supplying an identification signal to the control means related to the identification code entered; and wherein:

the control means compares the identification signal with the identification code assigned upon reservation of the space and supplies an alert signal if the comparison does not match the identification signal with the identification code.

41. A system as defined in claim 1, wherein the control means generates data representing utilization of the spaces and generates a report on a revenue to be collected for the utilization of the spaces.

42. A method as defined in claim 32, further comprising:

ceasing the indication of available spaces in the parking area after having previously indicated the availability of spaces in the parking area when the number of available spaces in the parking area reaches a second predetermined threshold value being different than the predetermined threshold value first aforesaid.

43. A method as defined in claim 25, further comprising:

communicating information over an external communication network to a prospective user relative to the availability of spaces in the facility.

44. A method as defined in claim 43, further comprising:

requesting a reserved space in the facility by said prospective user communicating information over an external communication network;

reserving said space for a prospective user by assigning a unique identification code associated with the prospective user to the space reserved;

confirming use of the reserved spaces by the user of the reserved spaces registering the unique identification code upon parking the vehicle in the reserved spaces;

comparing the identification code registered with the identification code assigned upon reservation of the spaces; and issuing an alert if the comparison does not match the identification code entered with the identification code assigned.

45. A method as defined in claim 23, further comprising:

generating data representing utilization of the spaces and generating a report on revenue which should be collected for the utilization of the spaces.

* * * * *